April 12, 1966  W. C. OSWALD  3,245,486
VEHICLE SEAT SUSPENSION SYSTEM
Filed Dec. 9, 1963  2 Sheets-Sheet 1
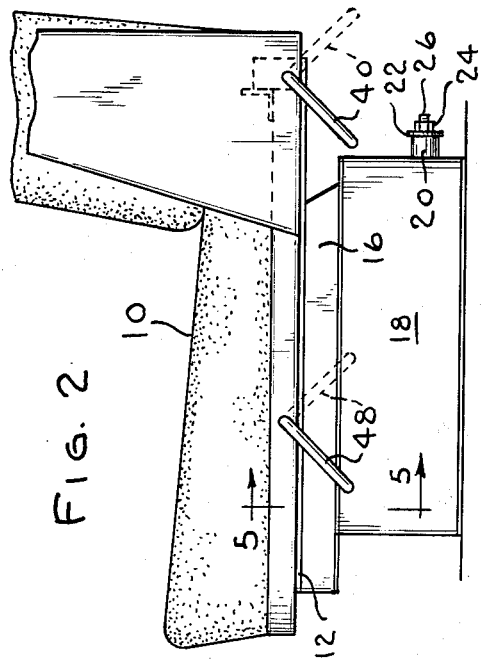
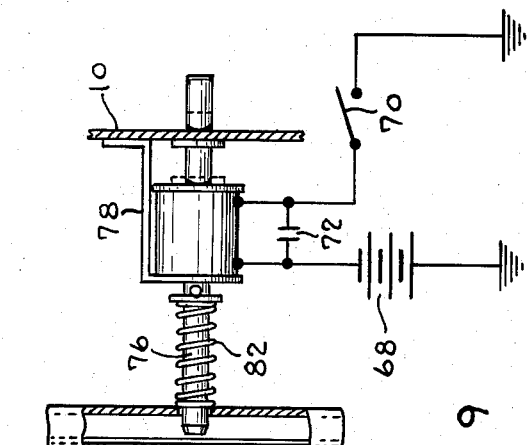
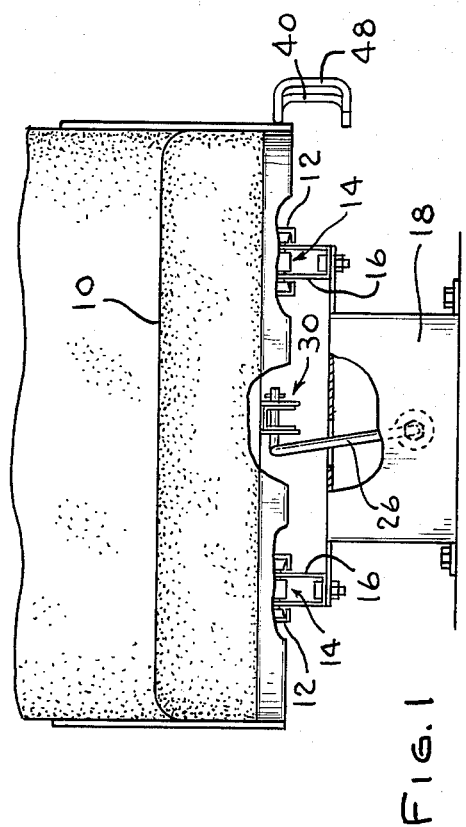
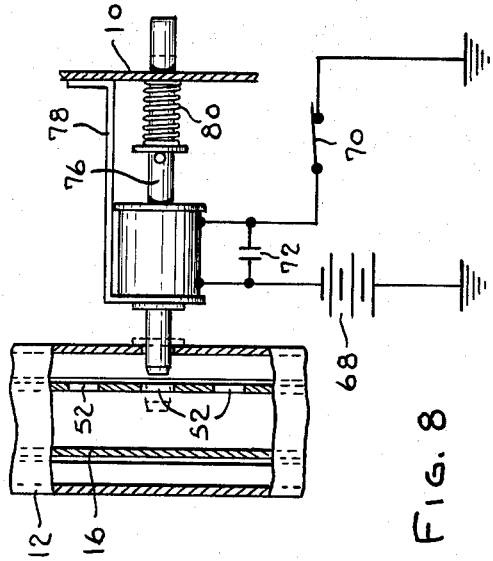
INVENTOR.
WILLIAM C. OSWALD
BY John W. Michael
ATTORNEY

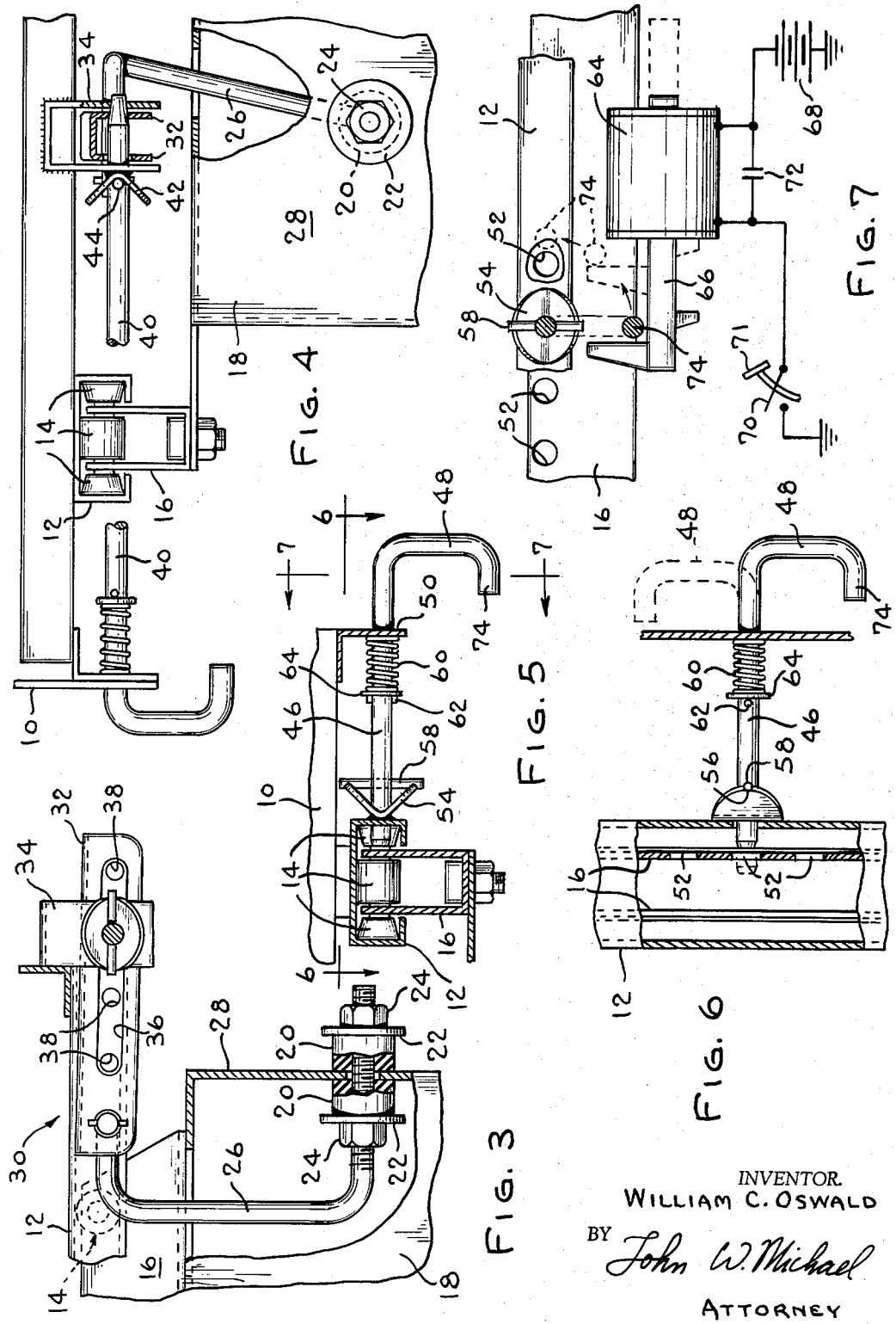

United States Patent Office 3,245,486
Patented Apr. 12, 1966

3,245,486
VEHICLE SEAT SUSPENSION SYSTEM
William C. Oswald, Wauwatosa, Wis., assignor to Bostrom Corporation, Milwaukee, Wis., a corporation of Wisconsin
Filed Dec. 9, 1963, Ser. No. 329,162
8 Claims. (Cl. 180—1)

This invention pertains to vehicle seats and particularly to improvements in vehicle seat suspension systems.

One of the basic purposes of any vehicle seat spring structure is to provide ride characteristics which will permit the occupant to maintain proper control over the vehicle and its associated equipment. In a broad sense, this purpose is attained by elastically isolating the seat from the exciting frequencies of the vehicle to thereby reduce the force and amplitude of the vehicle vibrations which are transmitted to the occupant. An inherent weakness of any suspension system of this type is that the system necessarily has its own natural or resonant frequency at which the transmissability is greater than unity, i.e. at which the force and amplitude of the vibrations experienced by the seat and its occupant are greater than the exciting frequencies of the vehicle.

Because of the various road and/or operating conditions to which a vehicle is subjected during its normal use, it is inevitable that on occasion the vehicle seat and its occupant will be subjected to resonant bounding vibrations which inherently will be more severe than the vibrations experienced by the vehicle. On these occasions, it is extremely difficult to maintain proper control over the vehicle; however, the occasional resonant bounding has been considered by the trade as a necessary evil that has be be accepted in order to obtain the otherwise highly desirable elastic suspension during the majority of operating conditions.

The principal object of this invention is to provide a vehicle seat which will eliminate the above described weakness of elastically supported vehicle seats.

Another important object of this invention is to provide a vehicle seat which will be properly isolated from the vehicle during the majority of operating conditions of the vehicle, yet which will permit the locking out of the isolation system at times when undesirable vibrations of the seat occur or are anticipated.

It can be said that in general two particular conditions exist during which the vehicle operator would prefer a direct or non-elastic tie of the seat to the vehicle over the elastic seat support thought highly beneficial during "normal" operating conditions. One of the two conditions is the actuation of a control of the vehicle or its associated machinery which actuation will subject the vehicle to a considerable shock, thereby tending to cause bounding oscillations of the seat. A typical example of the above is the sudden application of the brakes of a truck. In cases of brake application, the horizontal or fore and aft isolation of the vehicle seat will be the one which will normally cause the objectionable bounding of the seat. The second condition is one when the vehicle operator has to maintain extremely delicate control over the vehicle, and therefore desires to maneuver the same by the "feel of the road." The backing up and dumping of a dump truck is a good example of this condition. The vehicle seat embodying the present invention incorporates a locking mechanism by means of which the elastic support of the vehicle seat may be locked out to provide the direct tie to the vehicle whenever the operating conditions of the vehicle render such tie desirable.

Other objects and advantages will be pointed out in, or be apparent from, the specification and claims, as will obvious modifications of the four embodiments shown in the drawings, in which:

FIG. 1 is the front view of the vehicle seat embodying the present invention with parts being broken away for the sake of clarity;

FIG. 2 is a side view of the seat shown in FIG. 1, the adjustment rod being shown in dashed lines when in a disengaging position;

FIG. 3 is a fragmentary side view of the spring suspension and the fore and aft seat position adjustment mechanism;

FIG. 4 is a rear view of the structure shown in FIG. 3;

FIG. 5 is a cross-sectional view of the rail structure and side view of the manual lock-out mechanism;

FIG. 6 is a view taken on line 6—6 of FIG. 5;

FIG. 7 is a view taken on line 7—7 of FIG. 5 showing the lock-out mechanism equipped with automatic actuating means;

FIG. 8 is a cross-sectional view of the seat structure and the top view of another type of automatic lock-out mechanism; and FIG. 9 is a view, as in FIG. 8, of a modification of the mechanism shown in FIG. 8, the lock-out mechanisms of FIGS. 2 and 5–9 being shown in solid lines when in a disengaging position and in dashed lines when in an engaging position.

The vehicle seat illustrated in the drawings is of the type in which the seat part is mounted for limited fore and aft motion in respect to a fixed support member. Suitable spring structure is provided to resiliently resist this fore and aft motion and thus to provide the desired vibrational isolation of the seat from the horizontal vibrations of the vehicle. The particular seat is disclosed in detail in the U.S. Patent 3,100,618 issued on August 13, 1963 to Tengler et al., and is shown herein merely to illustrate an elastically supported vehicle seat.

The seat 10 carries a pair of rails 12 which cooperate with roller assemblies 14 carried by channels 16 provided on the base 18 which in turn is fixed to the vehicle. The fore and aft motion of the seat is resiliently resisted by rubber bushing resilient means 20 mounted by means of washers 22 and nuts 24 on one end of a spring rod 26 and operable to oppose the pivotal motion of the spring rod in respect to its connection to the wall 28 of the base 18.

The spring rod is connected by means of a fore and aft seat position adjustment mechanism 30 (FIG. 3) to the seat 10. As more fully described in the Tengler et al. patent, the adjustment mechanism is comprised of a pair of nested channels 32 and 34 fixed to the rod and seat respectively. One flange of channel 32 is provided with a slot 36 and the other with a plurality of adjustment holes 38. Any one of the holes 38 may be engaged by means of spring biased adjustment rod 40 to fix the fore and aft position of the seat. A cam 42 is fixed to channel 34 and cooperates with pin 44 to permit the withdrawal of the rod 40 from the inter-locking position (FIG. 4) upon a 90° rotation of the rod. At the fixed position, the resilient means 20 permit limited fore and aft motion of the seat 10 in respect to the base and provide the necessary isolation of the seat and its occupant from the vibrations of the vehicle.

Under the majority of operating conditions, the resilient means 20 will permit oscillation of the seat well within the acceptable limits for providing a smooth ride and for assuring proper and unhampered control of the vehicle by the occupant. However, at times of excessive bounding of the vehicle or at times when the vehicle is subjected to vibrations close to the resonant frequency of the seat support system, the isolation provided by the resilient means 20 will be detrimental rather than beneficial.

To assure proper control over the vehicle at these instances, I provide a lock-out mechanism by means of which the resilient means 20 may be locked out or eliminated from the support system in anticipation of unfavorable vibratory conditons. The lock-out mechanism shown in FIGS. 5 and 6 permits manual lock out and therefore allows the occupant to prepare the seat in condition for delicate maneuvering or for undesirable vehicle vibrations, should he anticipate such. The mechanisms shown in FIGS. 7-9 are responsive to sensing means which automatically anticipate the probability of unfavorable vibrations and thus automatically lock out the spring structure before the vehicle vibration has had a chance to cause undesirable bounding of the seat.

Referring to FIGS. 5 and 6, a lock-out rod 46, having a handle portion 48, is rotatably and slidably carried in suitable apertures provided in the rail 12 and bracket 50. Both the rail and bracket are fixed to the underside of the seat 10. Channel 16 is provided with a plurality of apertures 52 which may be engaged by the lock-out rod 46 to thereby rigidly connect the seat 10 to the base 18. This engagement of course will lock out the resilient means 20 and render them inoperative to effect the vibration of the seat. The lock-out rod 46 may be considered the male member and the channel 16 and its apertures 52 the female member of a locking assembly. These two members travel relative to each other in accordance with or indicative of the relative travel of the seat 10 in respect to the base 18 whenever the locking assembly is disengaged.

A cam 54 is fixed to the rail 12 and is provided with small depressions 56 which engage pin 58 and maintain the rod 46 in the disengaged position. Upon rotation of the rod, pin 58 will ride out of the depressions and will permit the compression spring 60 to move the rod to an engaging position with one of the apertures 52. Tabs 62 and a washer 64 are provided to fix the spring to the rod. In the case that none of the apertures 52 is aligned with the rod at this time, the rod will bear against channel 16 and will engage an aperture as it is brought into an aligning position by the oscillation of the seat. When the occupant desires to return the seat to its elastically isolated position, he rotates the rod 46 to the disengaged position shown in FIG. 5.

Referring to FIG. 7, a solenoid 64, having a plunger 66, is provided to impart the initial turning motion to the lock-out rod 46, after which spring 60 will move the rod to an engaging position. The solenoid is connected to a source of electrical energy 68 and is energized upon the closing of a normally open switch 70. When energized, the plunger 66 travels from the full line position of FIG. 7 to the dashed line position shown therein and causes the necessary initial engaging movement of rod 46. The switch 70 may be connected for actuation by the brake pedal 71 of the vehicle, whereby the switch will be closed upon the depression of the brake pedal and opened upon the release of the same. The switch 70 may be considered as operating means which reacts to a change in a condition of the vehicle, to wit, the change from a driving condition without brake application to a condition with brake application. In view of the fact that a change of this type will quite often subject the seat and its occupant to more severe vibrations or a shock, the latter occurring usually a time interval after the initial brake application, the change in the condition of the vehicle may be said to be conducive to undesirable vibrations of the vehicle. The actuation of the switch 70 by a driving control, as the brake pedal 71 in the illustrated case, will prevent such undesirable vibrations by actuating the lock-out mechanism to change the vibration isolation provided by the resilient means 20 and thus permit the occupant to maintain better control over the vehicle. It might be undesirable to lock out the resilient support system at times when the occupant merely applies or pumps his brakes as would be the case when slowing down in traffic. To avoid this, a capacitor 72 can be provided across the winding of the solenoid to thereby delay the actuation of the lock-out mechanism for a desired period of time. In this light the capacitor 72 may be properly considered as time delay or time dependent means. Thus, the capacitor can be of a value which will not cause energization of the solenoid during pumping of the vehicle brakes, but will cause energization only when the brakes are applied for a sufficiently long time to indicate that the vehicle will come to a stop. After the brakes are released, the occupant can turn the handle in a clockwise direction (when viewed in FIG. 7), thereby causing end 74 of the rod 46 to engage the plunger 66 and move it to the outward position.

The embodiments shown in FIGS. 8 and 9 are completely automatic in that the lock-out mechanism is engaged and disengaged in response to a vehicle control actuated device. In both embodiments, the plunger 76 is directly engageable with one of the apertures 52 to lock out the resilient support system. In FIG. 8, the solenoid is fixed to the seat 10 by an appropriate bracket 78 and maintains its plunger in a disengaged position at times when the solenoid is engaged by virtue of a vehicle control actuated switch 70 being in a closed position. When switch 70 is opened in response to a change in vibratory conditions of the vehicle or to the actuation of a vehicle control by the occupant, the solenoid releases its holding force in the plunger and spring 80 causes the plunger to move to an engaging position. When the condition has passed, switch 70 closes and causes the solenoid to be energized to move its plunger to a disengaged position.

The embodiment shown in FIG. 9 is similar to that shown in FIG. 8; however, spring 82 biases and maintains the plunger 76 in a disengaged position, and the solenoid moves the plunger to an engaging position when it is engaged by virtue of closing of vehicle control actuated switch 70. Both embodiments are shown equipped with a capacitor 72 for the purpose described heretofore.

Although but four embodiments of the present invention have been illustrated and described, it will be apparent to those skilled in the art that various changes and modifications may be made therein without departing from the spirit of the invention or from the scope of the appended claims.

I claim:

1. A vehicle seat comprising a base part adapted to be fixed to a vehicle,
    a seat part,
    resilient means connecting said seat part and base part and operable to vibrationally isolate said seat part from the vibrations of the vehicle,
    operating means operable to react independently of the vibratory condition of said seat part to a change in a condition of the vehicle which change will be conducive to undesirable vibrations of said seat part,
    locking means operable to rigidly engage said seat part with said base part, said locking means being responsive to said operating means as said operating means reacts to said change in condition to thereby rigidly engage said seat part with said base part and render said resilient means inoperative, and
    means for disengaging said locking means from said rigidly engaging position.

2. A vehicle seat according to claim 1 including time delay means operable to delay the actuation of said locking means in response to said operating means for a predetermined length of time.

3. A vehicle seat according to claim 1 wherein said operating means is operably connected to the brake pedal of a vehicle and is responsive to the actuation of the vehicle's brakes.

4. A vehicle seat according to claim 3 wherein said seat part is mounted for relative fore and aft movement in respect to said base part and wherein said resilient means vibrationally isolates said seat part from the fore and aft vibrations of the vehicle.

5. A vehicle seat comprising:
a base part adapted to be fixed to a vehicle,
a seat part mounted for relative movement in respect to said base part,
resilient means connecting said seat part and base part and operable to vibrationally isolate said seat part from the vibrations of the vehicle,
locking means movable between a locking position at which said seat and base parts are rigidly connected to render said resilient means inoperative and an unlocking position at which said resilient means is operative,
first actuating means for moving said locking means to a locking position,
second actuating means for moving said locking means to an unlocking position, and
means connected to a vehicle driving control and to said first actuating means to cause said actuating means to move said locking means to a locking position in response to movement of the vehicle driving control to one position.

6. A vehicle seat according to claim 5 wherein said second actuating means moves said locking means in response to the movement of the vehicle driving control to another position.

7. A vehicle seat according to claim 5 wherein said first actuating means comprises a solenoid and means for connecting said solenoid for energization, and wherein said means connected to a vehicle driving control comprises a switch movable to connect said solenoid for energization in response to said movement of the vehicle driving control.

8. A vehicle seat comprising:
a base part adapted to be fixed to a vehicle,
a seat part,
resilient means connecting said seat part to said base part for relative movement in respect thereto and to vibrationally isolate said seat part from the vibrations of the vehicle,
locking means having a male and a female member movable in respect to each other between engaging and disengaging positions, one of said members being connected to said seat part and the other of said members being connected to said base part thereby causing at times when said seat and base parts are in said disengaging positions relative movement between said members indicative of said relative movement between said seat and base parts,
means for moving one of said members into the path of travel of the other of said members to cause said members to engage each other and form a connection between said seat and base parts to eliminate their relative movement and said vibrational isolation.

References Cited by the Examiner

UNITED STATES PATENTS

| | | | |
|---|---|---|---|
| 25,628 | 10/1859 | Button et al. | 267—2 |
| 1,975,119 | 10/1934 | Oates | 280—6 |
| 2,308,446 | 1/1943 | Fruehauf | 248—399 X |
| 2,624,613 | 1/1953 | Parmely | 296—65 |
| 2,850,073 | 9/1958 | Smith | 248—430 |
| 3,100,618 | 8/1963 | Tengler et al. | 248—430 |

BENJAMIN HERSH, *Primary Examiner.*

A. HARRY LEVY, *Examiner.*